US008274372B2

United States Patent
Fujino

(10) Patent No.: US 8,274,372 B2
(45) Date of Patent: Sep. 25, 2012

(54) APPARATUS FOR EFFICIENTLY LOCATING AND COMMUNICATING WITH A SPECIFIC RFID TAG AMONG A PLURALITY OF GROUPS OF TAGS

(75) Inventor: Hiroaki Fujino, Aichi (JP)

(73) Assignee: Brother Kogyo Kabushiki Kaisha, Nogoya-Shi, Aichi (JP)

( * ) Notice: Subject to any disclaimer, the term of this patent is extended or adjusted under 35 U.S.C. 154(b) by 146 days.

(21) Appl. No.: 12/707,170

(22) Filed: Feb. 17, 2010

(65) Prior Publication Data

US 2010/0141396 A1 Jun. 10, 2010

Related U.S. Application Data

(63) Continuation-in-part of application No. PCT/JP2008/066322, filed on Sep. 10, 2008.

(30) Foreign Application Priority Data

Sep. 27, 2007 (JP) .................................. 2007-250857

(51) Int. Cl.
*H04Q 3/58* (2006.01)
(52) U.S. Cl. ........................................ 340/10.4; 340/8.1
(58) Field of Classification Search ....... 340/571–572.5, 340/539.1, 539.13, 539.21, 10.1–10.52
See application file for complete search history.

(56) References Cited

U.S. PATENT DOCUMENTS

| | | | | |
|---|---|---|---|---|
| 4,525,713 A * | 6/1985 | Barletta et al. | ............. | 340/10.31 |
| 5,565,858 A * | 10/1996 | Guthrie | ....................... | 340/10.33 |
| 5,588,005 A * | 12/1996 | Ali et al. | ....................... | 370/346 |
| 5,959,568 A * | 9/1999 | Woolley | ........................... | 342/42 |
| 6,318,636 B1 * | 11/2001 | Reynolds et al. | ......... | 235/472.01 |
| 6,496,806 B1 * | 12/2002 | Horwitz et al. | ............... | 705/28 |
| 6,600,418 B2 * | 7/2003 | Francis et al. | ............. | 340/572.1 |
| 6,717,516 B2 * | 4/2004 | Bridgelall | ................... | 340/572.1 |
| 6,726,099 B2 * | 4/2004 | Becker et al. | ................. | 235/380 |
| 6,963,282 B1 * | 11/2005 | Yeates et al. | ............... | 340/572.4 |
| 7,091,860 B2 * | 8/2006 | Martinez de Velasco Cortina et al. | .......................... | 340/572.1 |
| 7,240,837 B2 | 7/2007 | Fujii | | |
| 7,286,043 B2 * | 10/2007 | Carrender et al. | ......... | 340/10.42 |
| 7,295,120 B2 * | 11/2007 | Waldner et al. | ............ | 340/572.7 |
| 7,839,289 B2 * | 11/2010 | Chung et al. | ............... | 340/572.8 |

(Continued)

FOREIGN PATENT DOCUMENTS

JP 10-320515 12/1998

(Continued)

*Primary Examiner* — Benjamin C Lee
*Assistant Examiner* — Stephen Burgdorf
(74) *Attorney, Agent, or Firm* — McCarter & English, LLP

(57) ABSTRACT

An apparatus for communicating with an RFID tag is provided which has a radio communicating device configured to conduct radio communication with a plurality of individual RFID tags constituting a single tag group and a single representative RFID tag associated so as to represent the tag group. A first information obtainment portion is configured to conduct first communication for search of the representative RFID tag corresponding to the individual RFID tag to be searched and to obtain information from the representative RFID tag; a switching determination portion configured to determine if the first communication in information obtainment satisfies a predetermined switching condition. A second information obtainment portion configured to conduct second communication for search of the individual RFID tag to be searched in a communication mode different from that of the first communication if the determination is satisfied and to obtain information from the individual RFID tag.

9 Claims, 10 Drawing Sheets

U.S. PATENT DOCUMENTS

| | | | |
|---|---|---|---|
| 7,920,050 B2 * | 4/2011 | Juels et al. | 340/10.4 |
| 7,961,097 B2 * | 6/2011 | Porte et al. | 340/572.1 |
| 2002/0126013 A1 * | 9/2002 | Bridgelall | 340/572.1 |
| 2002/0196126 A1 * | 12/2002 | Eisenberg et al. | 340/10.2 |
| 2004/0212480 A1 * | 10/2004 | Carrender et al. | 340/10.42 |
| 2004/0263319 A1 * | 12/2004 | Huomo | 340/10.2 |
| 2005/0206555 A1 * | 9/2005 | Bridgelall et al. | 342/127 |
| 2006/0267733 A1 * | 11/2006 | Steinke et al. | 340/10.1 |
| 2007/0046435 A1 * | 3/2007 | Fratti et al. | 340/10.2 |
| 2007/0096907 A1 * | 5/2007 | Jam et al. | 340/572.1 |
| 2007/0257112 A1 | 11/2007 | Fujii | |
| 2008/0157934 A1 * | 7/2008 | Posamentier | 340/10.42 |
| 2008/0231449 A1 * | 9/2008 | Moshfeghi | 340/572.1 |
| 2008/0294724 A1 * | 11/2008 | Strong et al. | 709/205 |

FOREIGN PATENT DOCUMENTS

| | | |
|---|---|---|
| JP | 10320515 | 12/1998 |
| JP | 2000-165930 | 6/2000 |
| JP | 2000 165930 | 6/2000 |
| JP | 2000 194896 | 7/2000 |
| JP | 2000-194896 | 7/2000 |
| JP | 2002 204197 | 7/2002 |
| JP | 2002-204197 | 7/2002 |
| JP | 2002 356227 | 12/2002 |
| JP | 2005 209002 | 8/2005 |

* cited by examiner

[FIG. 1A]
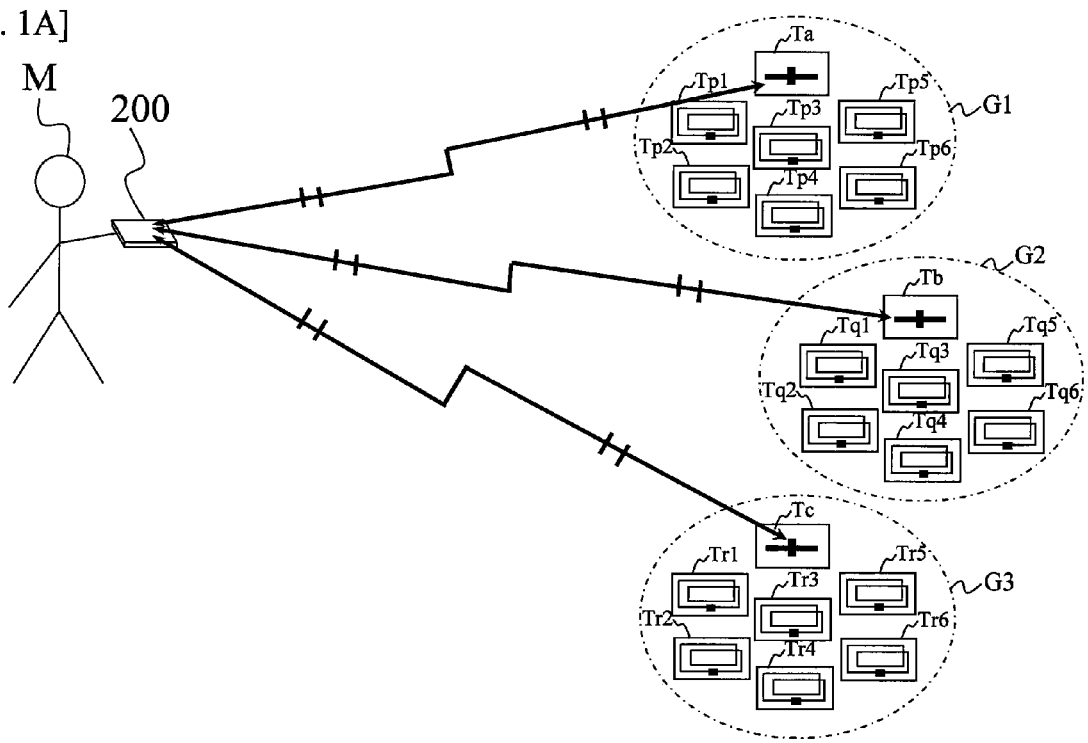
[FIG. 1B]
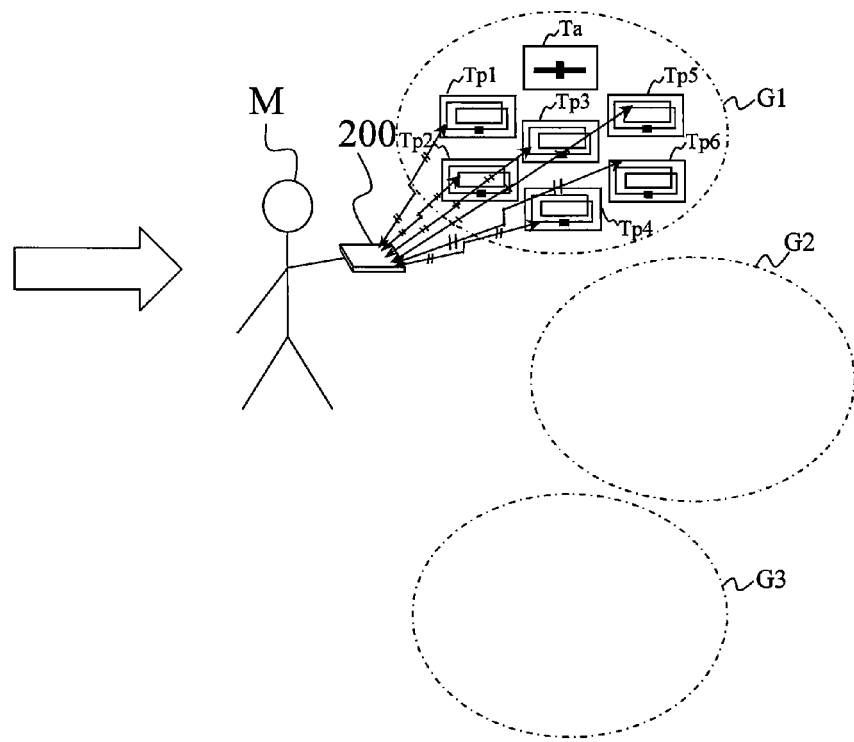

[FIG. 2]
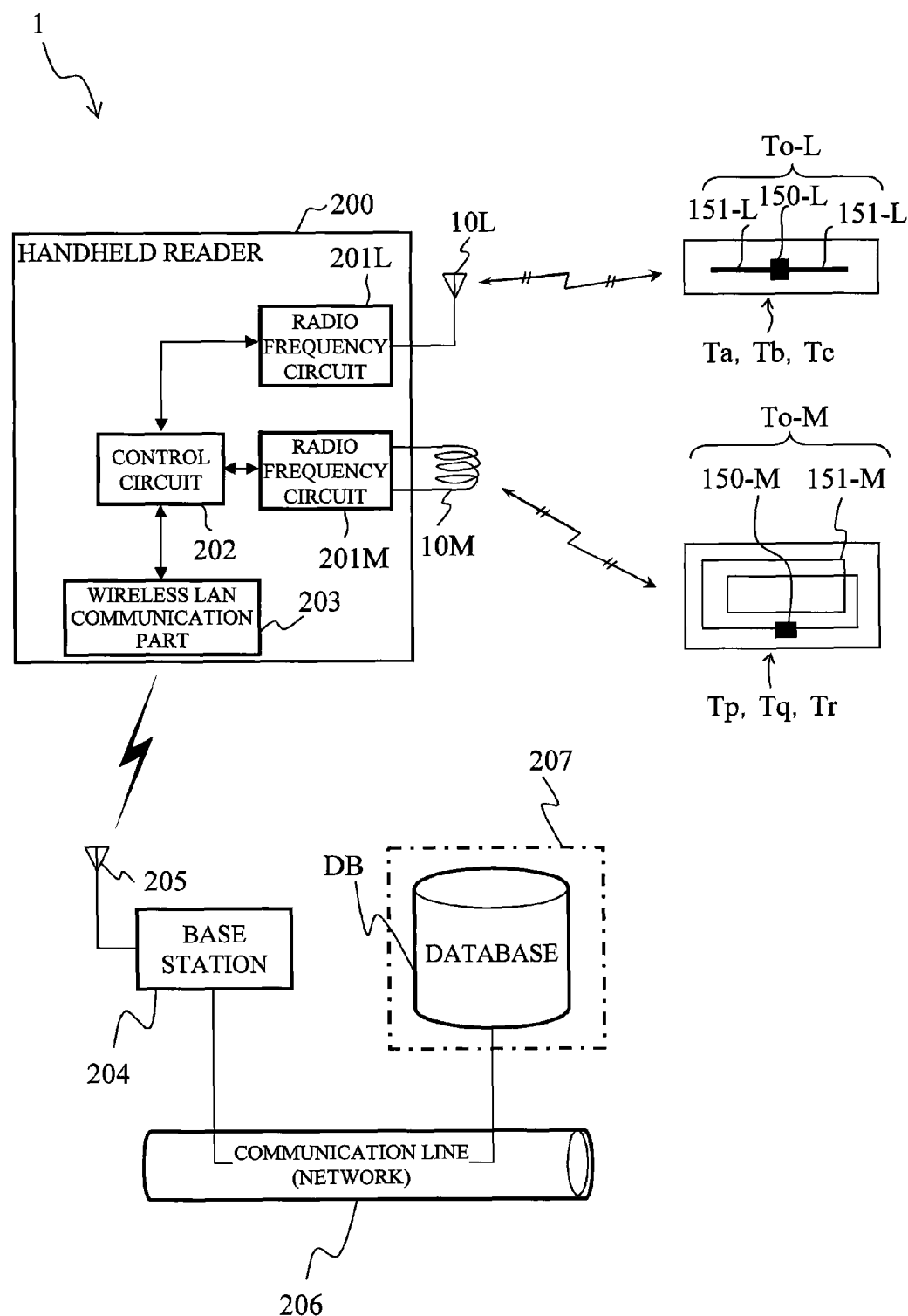

[FIG. 3]
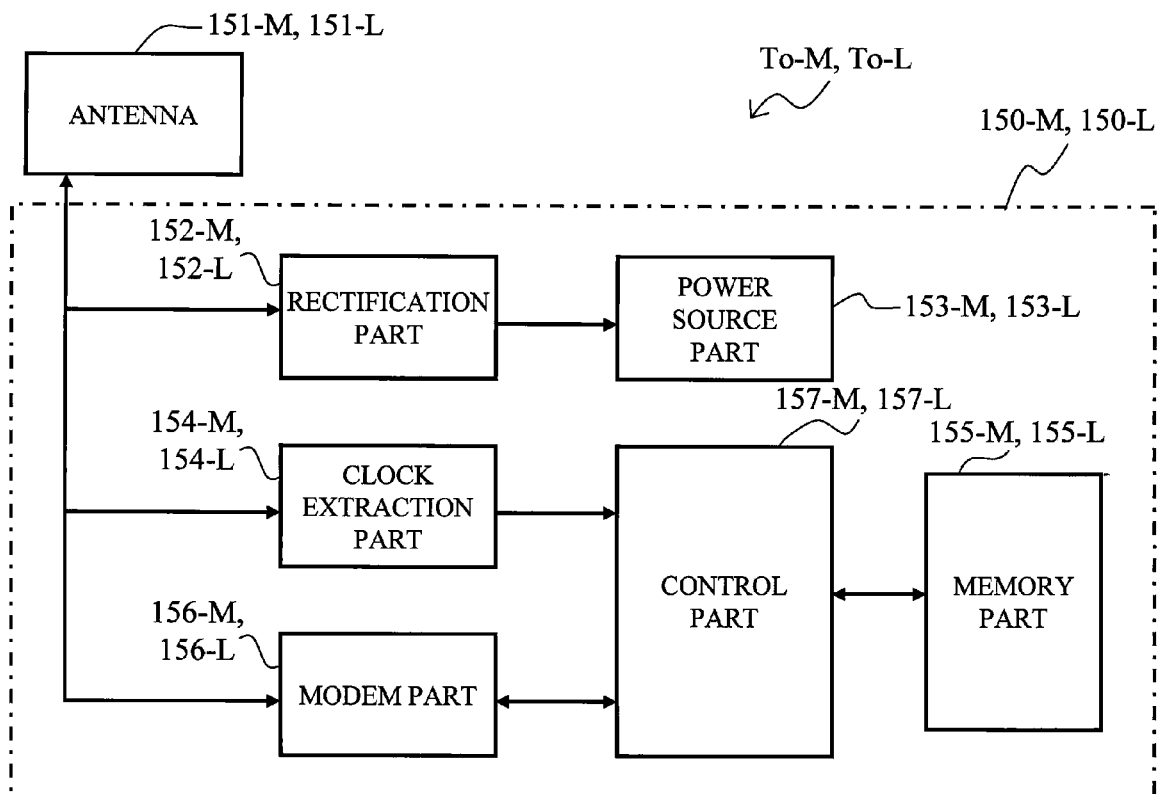

[FIG. 4]
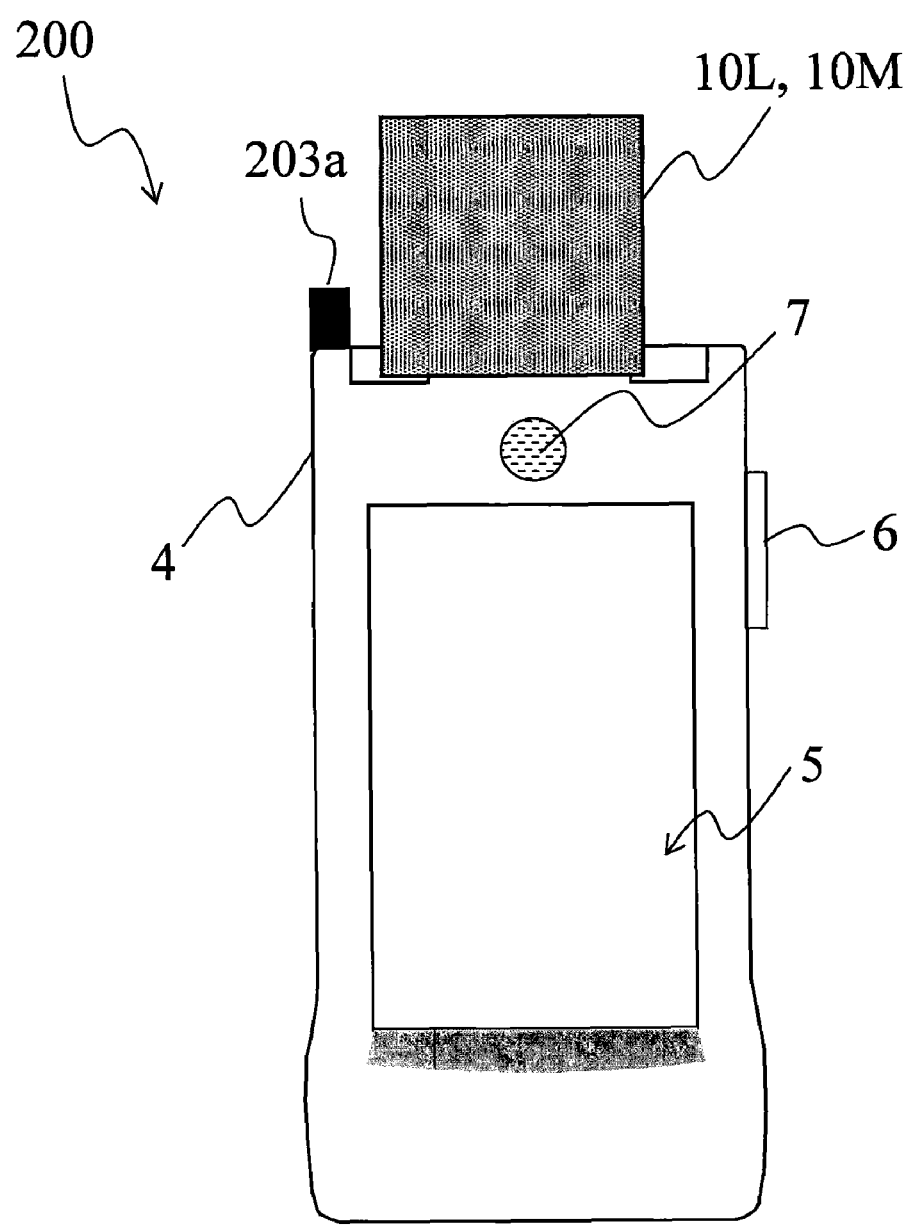

[FIG. 5]
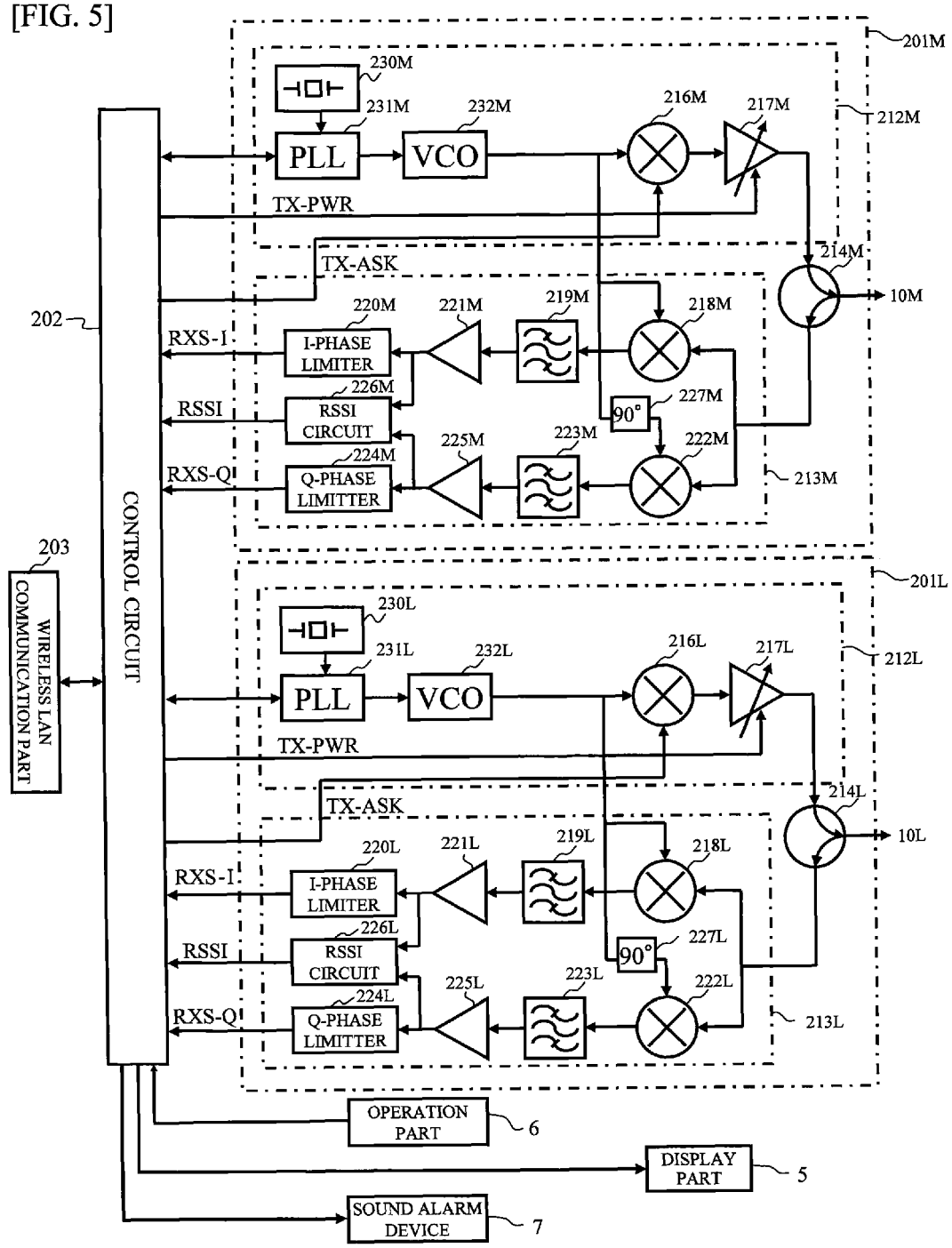

[FIG. 6]
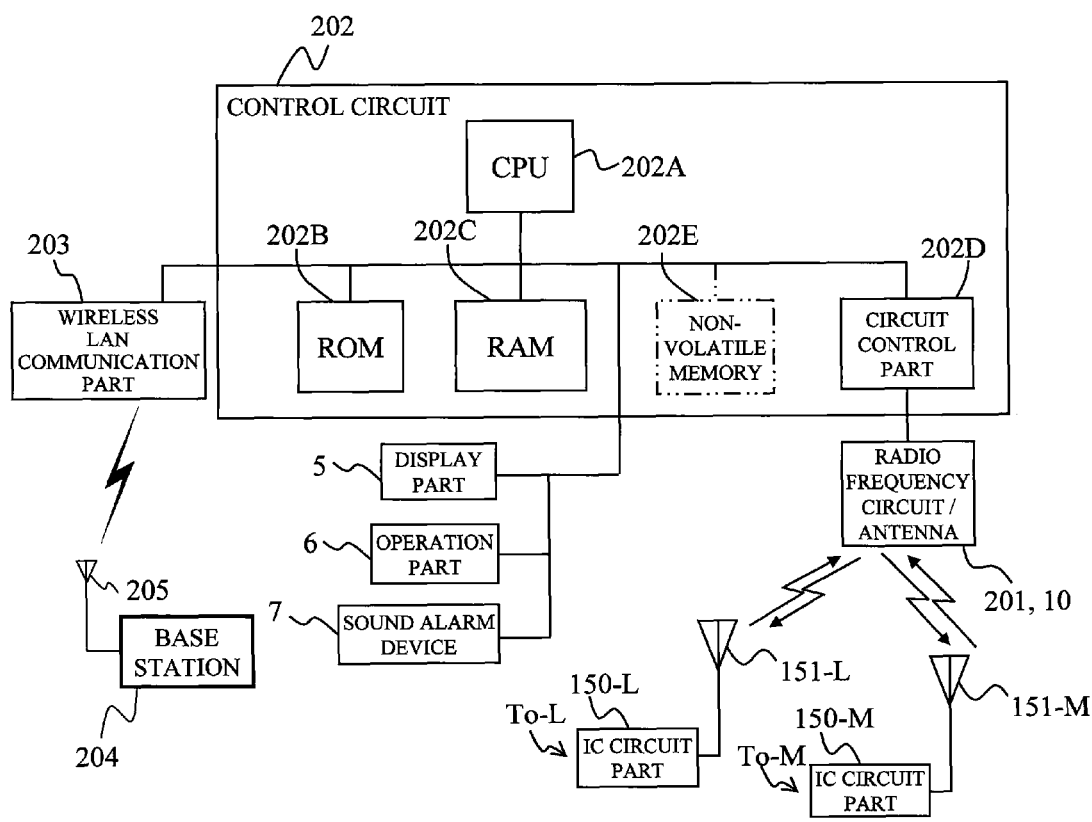

[FIG. 7]

| GROUP G1 ||
|---|---|
| REPRESENTATIVE TAG ID | INDIVIDUAL TAG ID |
| 6000012A (Ta) | 80000151 (Tp1) |
| 6000012A (Ta) | 80000152 (Tp2) |
| 6000012A (Ta) | 80000153 (Tp3) |
| 6000012A (Ta) | 80000154 (Tp4) |
| ... | ... |
|  |  |

[FIG. 8]
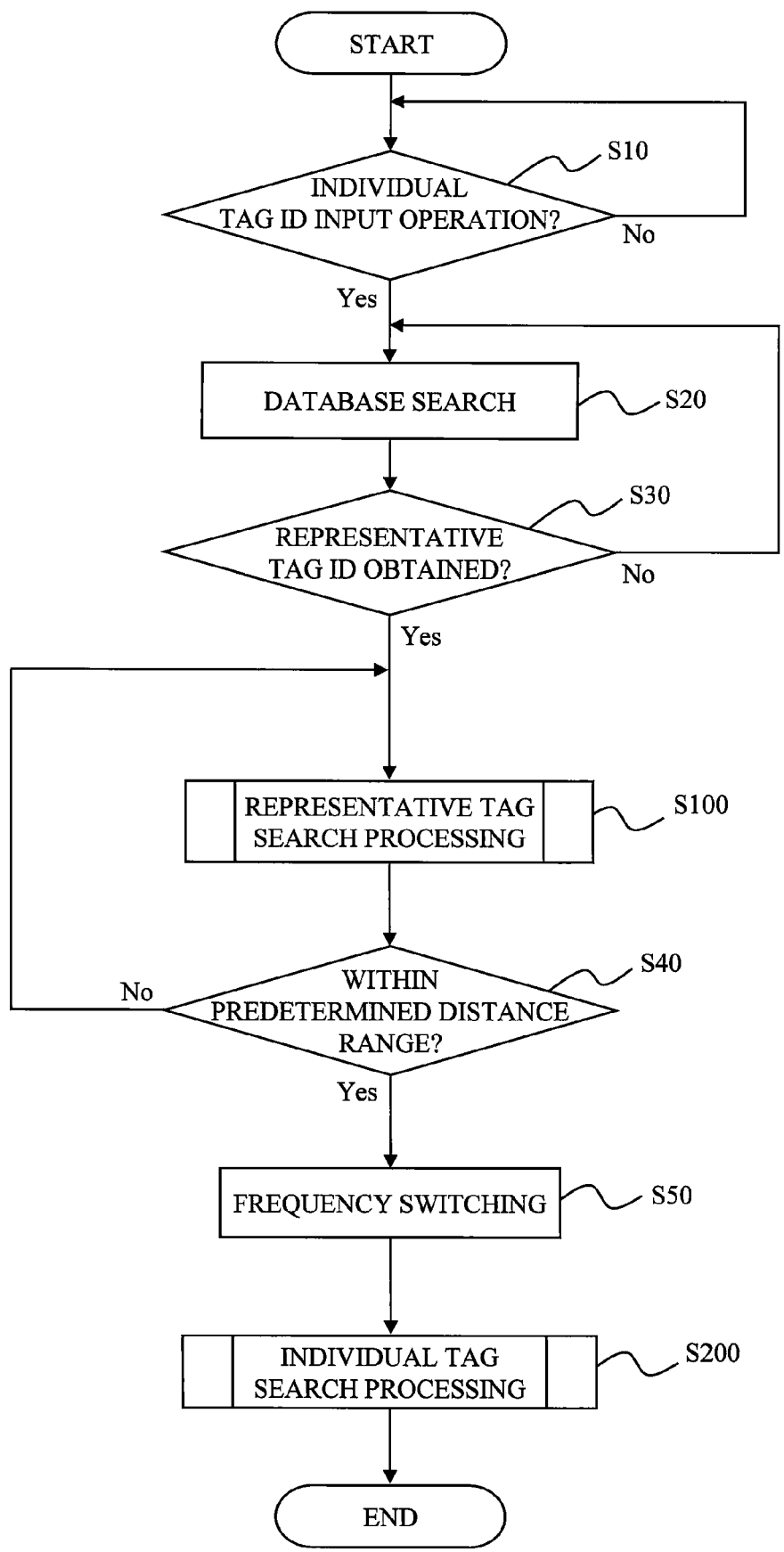

[FIG. 9]
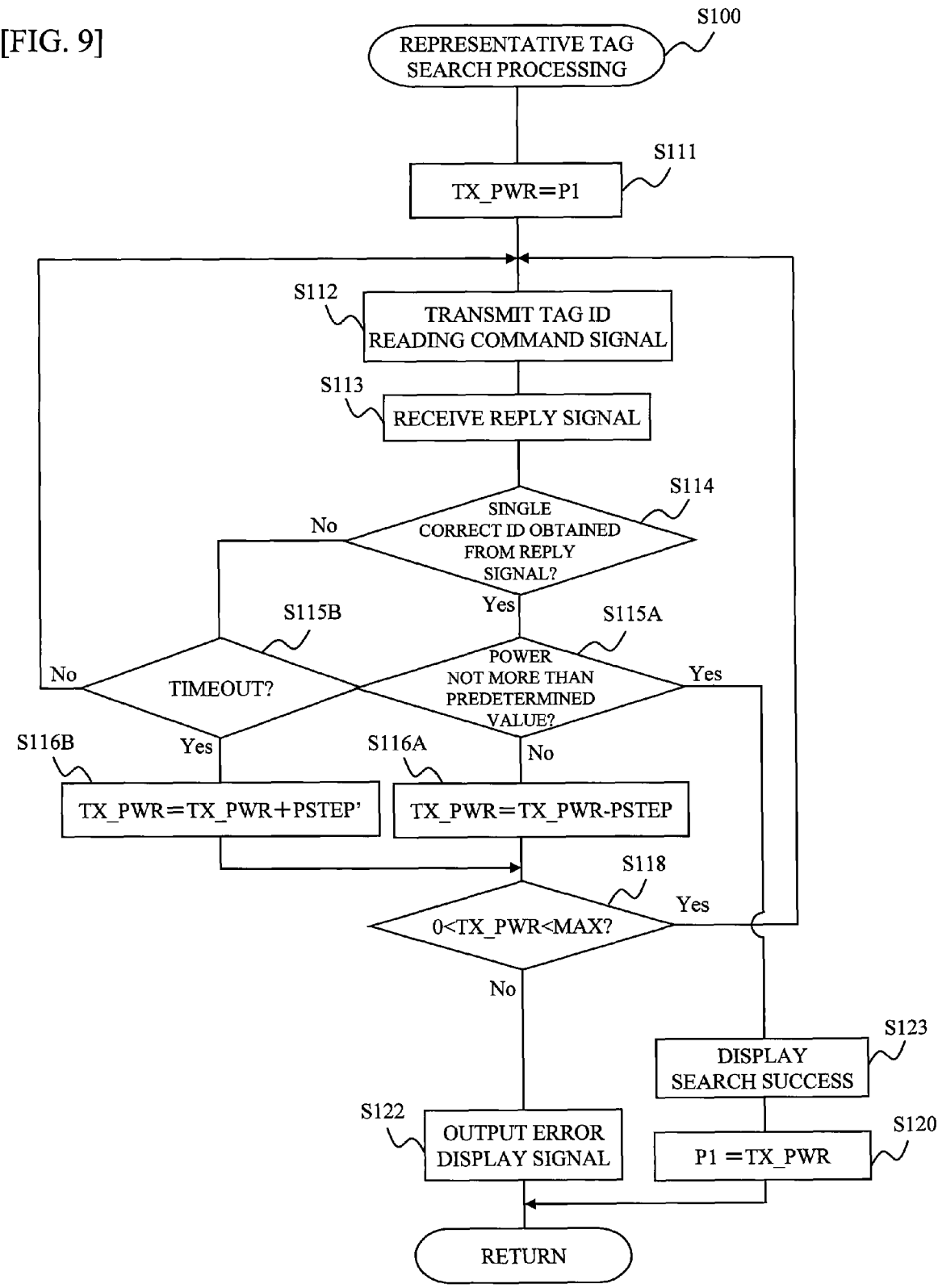

[FIG. 10]
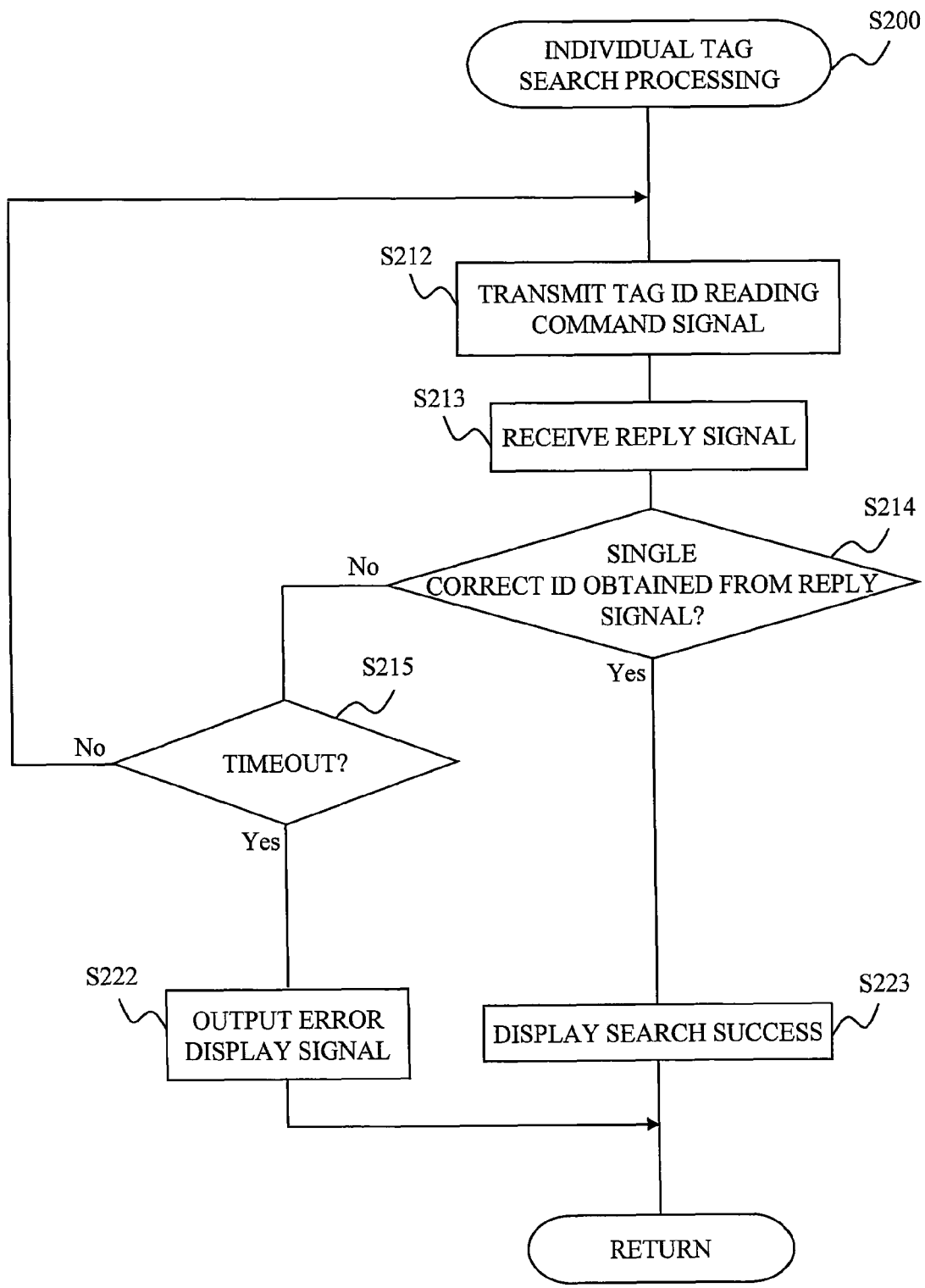

APPARATUS FOR EFFICIENTLY LOCATING AND COMMUNICATING WITH A SPECIFIC RFID TAG AMONG A PLURALITY OF GROUPS OF TAGS

CROSS-REFERENCE TO RELATED APPLICATION

This is a CIP application PCT/JP2008/66322, filed Sep. 10, 2008, which was not published under PCT article 21(2) in English.

BACKGROUND OF THE INVENTION

1. Field of the Invention

The present invention relates to an apparatus for communicating with an RFID tag configured to perform information reading from an RFID tag capable of radio communication of information with an outside.

2. Description of the Related Art

A Radio Frequency Identification (hereinafter referred as RFID) system configured to transmit and receive information in a non-contact manner with an RFID tag storing information is known. The non-contact transmission and reception methods include an electromagnetic coupling method using a coil, an electromagnetic induction method, and a radio wave method, for example.

An RFID tag circuit element provided in an RFID tag has an IC circuit part and a tag antenna. The IC circuit part stores predetermined RFID tag information. The tag antenna is connected to the IC circuit part and performs information transmission and reception. If a transmission wave is transmitted from a transmission antenna of a reader/writer to the RFID tag, the RFID tag circuit element replies to the transmission wave. There has been a prior art reference for smooth communication with a plurality of RFID tags with regard to an apparatus for communicating with an RFID tag configured to conduct such communication.

The prior art reference is provided with a transmission circuit part capable of creating a carrier wave with a plurality of frequencies. Then, according to an environment in which the plurality of RFID tags are mounted, a switching circuit part selects a frequency hardly affected by the environment. The transmission circuit part generates the carrier wave at the selected frequency. As a result, reliable communication can be conducted with each of the plurality of RFID tags.

For example, a plurality of RFID tags constitute a small group, and a plurality of the small groups constitute a large group so that a relatively large number of RFID tags are present in general. In order to make a quick search in such situation, it is more efficient that a rough search is made for small groups to which the RFID tag belongs and then, the RFID tag as a search target is searched in the small group.

However, in the prior art reference, the above-described point is not given particular consideration. That is, even if the small group and the large group are formed as above, a switching circuit part selects a frequency corresponding to the RFID tag as a search target, and then, individual RFID tags belonging to the small group are searched. That is, fine searches are made from the beginning for individual RFID tags, and an efficient search for a targeted RFID tag has been difficult.

SUMMARY OF THE INVENTION

The present invention has an object to provide an apparatus for communicating with an RFID tag that can search an RFID tag as a target efficiently and quickly even if a large number of RFID tags are present.

There are provided a radio communicating device configured to conduct radio communication with a plurality of individual RFID tags constituting a single tag group and one representative RFID tag associated to represent the tag group, a first information obtainment portion configured to conduct first communication in order to search the representative RFID tag corresponding to the individual RFID tag as a search target through the radio communicating device and to obtain information from the representative RFID tag, a switching determination portion configured to determine if the first communication in information obtainment by the first information obtainment portion satisfies a predetermined switching condition or not, and a second information obtainment portion configured to conduct second communication in order to search an individual RFID tag as the search target in a communication mode different from a communication mode of the first communication through the radio communicating device if the determination by the switching determination portion is satisfied and to obtain information from the individual RFID tag.

BRIEF DESCRIPTION OF THE DRAWING

FIG. 1A is an explanatory diagram conceptually illustrating an entire outline of an RFID tag communication system including a handheld reader of an embodiment of the present invention;

FIG. 1B is an explanatory diagram conceptually illustrating an entire outline of the RFID tag communication system including a handheld reader of an embodiment of the present invention;

FIG. 2 is a system configuration diagram illustrating an entire configuration of the RFID tag communication system;

FIG. 3 is a block diagram illustrating an example of a functional configuration of an RFID tag circuit element;

FIG. 4 is a front view illustrating an entire outline structure of a reader;

FIG. 5 is a functional block diagram illustrating a configuration of a control system of the reader;

FIG. 6 is a functional block diagram illustrating a detailed function of a control circuit disposed in the reader;

FIG. 7 is a conceptual diagram schematically illustrating an example of correlation information registered in a database of a server;

FIG. 8 is a flowchart illustrating a control procedure executed by the control circuit of the reader;

FIG. 9 is a flowchart illustrating a control procedure executed by the control circuit of the reader; and FIG. 10 is a flowchart illustrating a control procedure executed by the control circuit of the reader.

DETAILED DESCRIPTION OF THE PREFERRED EMBODIMENTS

An embodiment of the present invention will be described referring to the attached drawings.

In FIG. 1A, in this embodiment, a plurality of RFID tags gather and constitute a small group, and a relatively large number of RFID tags are present in general. The small groups refer to three tag groups G1, G2, and G3 in this example.

The tag group G1 includes a plurality of, that is, six in this example, individual RFID tags Tp1, Tp2, Tp3, Tp4, Tp5, and Tp6. Also, the tag group G1 includes a single representative RFID tag Ta associated to represent the tag group G1.

Similarly, the tag group G2 includes a plurality of, that is, six in this example, individual RFID tags Tq1, Tq2, Tq3, Tq4, Tq5, and Tq6. Also, the tag group G2 includes a single representative RFID tag Tb associated to represent the tag group G2.

Moreover, the tag group G3 includes a plurality of, that is, six in this example, individual RFID tags Tr1, Tr2, Tr3, Tr4, Tr5, and Tr6. Also, the tag group G3 includes a single representative RFID tag Tc associated to represent the tag group G3.

In this embodiment, an operator M makes a search for any of the individual RFID tags Tp1 to 6, Tq1 to 6, and Tr1 to 6 using a handheld reader 200 as an apparatus for communicating with an RFID tag. First, the reader 200 reads information from the representative RFID tags Ta, Tb, and Tc corresponding to the individual RFID tags Tp1 to 6, Tq1 to 6, and Tr1 to 6. Then, the operator is getting closer to the representative RFID tags Ta, Tb, and Tc while the reader 200 is conducting communication for search. If the reader 200 has gotten close to the representative RFID tags Ta, Tb, and Tc to some degree, the reader 200 switches a communication mode. The reader 200 switches the communication mode and then, reads information from the individual RFID tags Tp1 to 6, Tq1 to 6, and Tr1 to 6 to be searched finally. The details will be described later. In the illustrated example, a case in which the representative RFID tag Ta of the tag group G1 is searched (See FIG. 1A) and then, the individual RFID tags Tp1 to 6 are searched (See FIG. 1B) is shown as an example.

As shown in FIG. 2, an RFID tag communication system 1 has the reader 200, a base station 204, and a server 207.

The reader 200 accesses information of an RFID tag circuit element To-M provided in each of the individual RFID tags Tp, Tq, and Tr and performs reading in this example. Also, the reader 200 accesses information of an RFID tag circuit element To-L provided in each of the representative RFID tags Ta, Tb, and Tc and performs reading in this example.

The base station 204 is capable of conducting radio communication with the reader 200 through Local Area Network (LAN) via radio.

The server 207 is connected to the base station 204 through a radio or wired communication line 206. The server 207 has a database DB as a storage device.

The RFID tag circuit element To-L disposed in the representative RFID tags Ta, Tb, and Tc has an IC circuit part 150-L storing information and a tag antenna 151-L capable of information transmission and reception. The tag antenna 151-L is a known dipole antenna and has a structure suitable for communication in an Ultra High Frequency band, that is, a UHF band.

The RFID tag circuit element To-M disposed in the individual RFID tags Tp, Tq, and Tr has an IC circuit part 150-M storing information and a tag antenna 151-M capable of information transmission and reception. The tag antenna 151-M is configured in a loop-coil shape as shown in FIG. 2 and has a structure suitable for communication in a high frequency band, that is, an HF band.

The reader 200 has antennas 10L and 10M, radio frequency circuits 201L and 201M, a wireless LAN communication part 203, and a control circuit 202.

The antenna 10L transmits and receives a signal via radio communication with the tag antenna 151-L of the RFID tag circuit element To-L disposed in each of the representative RFID tags Ta, Tb, and Tc. The antenna 10M transmits and receives a signal via radio communication with the tag antenna 151-M of the RFID tag circuit element To-M disposed in each of the individual RFID tags Tp, Tq, and Tr.

The radio frequency circuit 201L accesses the IC circuit part 150-L of the RFID tag circuit element To-L through the antenna 10L via radio communication using an ultra high frequency (UHF) and performs reading in this example. Then, the radio frequency circuit 201L processes a signal read of the RFID tag circuit element To-L.

The radio frequency circuit 201M accesses the IC circuit part 150-M of the RFID tag circuit element To-M through the antenna 10M via radio communication using a high frequency (HF) and performs reading in this example. Then, the radio frequency circuit 201M processes a signal read of the RFID tag circuit element To-M.

The antennas 10L and 10M and the radio frequency circuits 201L and 201M constitute a radio communicating device described in each claim.

The control circuit 202 is connected to the radio frequency circuits 201L and 201M and the wireless LAN communication part 203 and controls them. The wireless LAN communication part 203 conducts communication via wireless LAN through the antenna 205 of the base station 204. That is, the information read by the reader 200 is transmitted to the database DB of the server 207 through the wireless LAN, the base station 205, and the communication line 206 in this example.

The RFID tag circuit element To-M has, as shown in FIG. 3, the tag antenna 151-M conducting signal transmission and reception in a non-contact manner using a radio wave at a high frequency band with respect to the antenna 10M of the reader 200 and the IC circuit part 150-M connected to the tag antenna 151-M. The tag antenna 151-M can use a radio wave at a frequency such as 13.56 MHz, for example, as a radio wave of the high frequency.

On the other hand, the RFID tag circuit element To-L has the tag antenna 151-L conducting signal transmission and reception in a non-contact manner using an ultra high frequency wave with respect to the antenna 10L of the reader 200 and the IC circuit part 150-L connected to the tag antenna 151-L. The tag antenna 151-L can use a radio wave at a frequency such as 2.45 GHz, for example, as a radio wave of the ultra high frequency.

The IC circuit part 150-M of the RFID tag circuit element To-M includes a rectification part 152-M, a power source part 153-M, a clock extraction part 154-M, a memory part 155-M, a modem part 156-M, and a control part 157-M. The rectification part 152-M rectifies an interrogation wave received by the tag antenna 151-M. The power source part 153-M accumulates energy of the interrogation wave rectified by the rectification part 152-M and uses the energy as a driving power source of the RFID tag circuit element To-M. The clock extraction part 154-M extracts a clock signal from the interrogation wave received by the tag antenna 151-M and supplies the signal to the control part 157-M. The memory part 155-M stores a predetermined information signal. The control part 157-M controls operations of the RFID tag circuit element To-M through the memory part 155-M, the clock extraction part 154-M, a random number generator 158-M, and the modem part 156-M, for example.

The modem part 156-M demodulates an interrogation wave from the antenna 10-M of the reader 200, received by the tag antenna 151-M. The modem part 156-M also modulates a reply signal from the control part 157-M and transmits it as a response wave, that is, a signal including the tag ID, from the tag antenna 151-M.

The clock extraction part 154-M extracts a clock component from the received signal and supplies a clock corresponding to a frequency of the clock component of the received signal to the control part 157-M.

The control part 157-M interprets a received signal demodulated by the modem part 156-M and generates a reply signal on the basis of the information signal stored in the memory part 155-M. Then, the modem part 156-M transmits the reply signal through the tag antenna 151-M.

The memory part 155-M stores the tag ID as identification information. This tag ID is specific information capable of specifying a predetermined article such as information obtainment target corresponding to the individual RFID tags Tp, Tq, and Tr. This tag ID may be unrewritably held in the memory part 155-M or may be rewritably held in the memory part 155-M.

The control circuit 202 of the reader 200 makes a query in the server 207 using the tag ID. As a result, the control circuit 202 reads various types of information regarding the information obtainment target stored and held in the database DB of the server 207 including article information such as an article name from the server 207. The article information is stored and held in the database DB of the server 207 in association with the tag ID upon input using an appropriate terminal in advance, for example. A non-volatile memory 202E, for example, which will be described later, may be used instead of the database DB.

The IC circuit part 150-L of the RFID tag circuit element To-L includes a rectification part 152-L, a power source part 153-L, a clock extraction part 154-L, a memory part 155-L, a modem part 156-L, and a control part 157-L. The IC circuit part 150-L, the rectification part 152-L, the power source part 153-L, the clock extraction part 154-L, the memory part 155-L, the modem part 156-L, and the control part 157-L have functions equal to the rectification part 152-M, the power source part 153-M, the clock extraction part 154-M, the memory part 155-M, the modem part 156-M, and the control part 157-M of the RFID tag circuit element To-M, respectively, and description will be omitted.

With the above configuration, the RFID tag circuit element To-M disposed in the individual RFID tags Tp, Tq, and Tr has frequency characteristics of receiving sensitivity different from the RFID tag circuit element To-L disposed in the representative RFID tags Ta, Tb, and Tc. That is, in the RFID tag circuit element To-M, the receiving sensitivity to an interrogation wave at 13.56 MHz, which is a high frequency band, is the highest. With the RFID tag circuit element To-L, the receiving sensitivity to the interrogation wave at 2.45 GHz, which is an ultra high frequency band, is the highest.

The reader 200 includes, as shown in FIG. 4, a housing 4, a display part 5, an operation part 6 such as a button and a switch, and a sound alarm device 7 such as a speaker. The display part 5 is disposed so as to occupy most of an upper part of the housing 4 (front side in FIG. 4) and displays contents of the read information, for example. The operation part 6 is disposed on a side face of the housing 4 and receives an operation by the operator M in information reading. The sound alarm device 7 makes predetermined alarm if information reading by the reader 200 fails.

On the housing 4, the antennas 10L and 10M capable of transmission and reception of a signal with respect to the RFID tag circuit elements To-L and To-M and an antenna 203a of the wireless LAN communication part 203 conducting communication via wireless LAN are disposed. A signal transmitted from the antennas 10L and 10M is transmitted to a front side (upper side in FIG. 4) of the reader 20 by means of known directivity control, for example.

The reader 200 includes, as shown in FIG. 5, the radio frequency circuit 201M, the radio frequency circuit 201L, and the control circuit 202.

The radio frequency circuit 201M accesses the information of the IC circuit part 150-M of the RFID tag circuit element To-M through the antenna 10M as described above and performs reading in this example. The radio frequency circuit 201L accesses the information of the IC circuit part 150-L of the RFID tag circuit element To-L through the antenna 10L and performs reading in this example.

The control circuit 202 controls an entire operation of the reader 200. The control circuit 202 processes a signal read of the IC circuit parts 150-M and 150-L of the RFID tag circuit elements To-M and To-L so as to read information and creates access information to access the IC circuit parts 150-M and 150-L of the RFID tag circuit elements To-M and To-L.

The radio frequency circuits 201M and 201L have a function to conduct communication with the RFID tag circuit elements To-M and To-L, respectively, by transmission and reception of a radio wave in the known high frequency and ultra high frequency bands, though detailed description will be omitted. The radio frequency circuits 201M and 201L include transmitting portions 212M and 212L configured to transmit a signal to the RFID tag circuit elements To-M and To-L through the antennas 10M and 10L, receiving portions 213M and 213L configured to receive input of reflective waves from the RFID tag circuit elements To-M and To-L received by the antennas 10M and 10L, and transmit-receive splitters 214M and 214L.

A functional configuration of the radio frequency circuit 201M will be described below for facilitation of the description. The radio frequency circuit 201L has the same configuration as that of the radio frequency circuit 201M described below other than particularly noted.

The transmitting portion 212M is a block configured to generate an interrogation wave to access RFID tag information of the IC circuit part 150-M of the RFID tag circuit part To-M through the antenna 10M and to perform reading. The transmitting portion 212M includes a crystal oscillator 230M, a Phase Locked Loop (hereinafter referred to as a "PLL") 231M, a Voltage Controlled Oscillator (hereinafter referred to as a "VCO") 232M, a transmission multiplying circuit 216M, and a gain control transmission amplifier 217M.

The crystal oscillator 230M outputs a reference signal of a frequency. The PLL 231M generates a carrier wave with a predetermined frequency by dividing and multiplying an output of the crystal oscillator 230M by means of control of the control circuit 202. The VCO 232M outputs a carrier wave with a frequency determined based on a control voltage generated by the PLL 231M. As the frequency of the generated carrier wave, a frequency in the HF band is used in the radio frequency circuit 201M. As the frequency of the generated carrier wave, a frequency in the UHF band is used in the radio frequency circuit 201L.

The transmission multiplying circuit 216M modulates the carrier wave generated based on the signal supplied from the control circuit 202. In this example, the transmission multiplying circuit 216M executes amplitude modulation on the basis of a "TX_ASK" signal from the control circuit 202. In the case of such amplitude modulation, an amplification rate variable amplifier, for example, may be used instead of the transmission multiplying circuit 216M.

The gain control transmission amplifier 217M amplifies the modulated wave modulated by the transmission multiplying circuit 216M and generates a desired interrogation wave. In this example, the gain control transmission amplifier 217M performs amplification with an amplification rate determined by a "TX_PWR" signal from the control circuit 202. The output of the gain control transmission amplifier 217M is transmitted to the antenna 10M through the transmit-receive splitter 214M, radiated from the antenna 10M as an interrogation wave and supplied to the IC circuit part 150-M of the RFID tag circuit part To-M. The interrogation wave is not limited to the signal modulated as above, that is, the modulated wave, but the wave might be a simple carrier wave.

The receiving portion 213 receives an input of a response wave from the RFID tag circuit part To received by the antenna 10M. The receiving portion 213 includes an I-phase receiving signal multiplying circuit 218M, an I-phase band-pass filter 219M, an I-phase receiving signal amplifier 221M, an I-phase limiter 220M, a phase shifter 227M, a Q-phase receiving signal multiplying circuit 222M, a Q-phase band-pass filter 223M, a Q-phase receiving signal amplifier 225M, a Q-phase limiter 224M, and a Received Signal Strength Indicator (hereinafter referred to as an "RSSI") circuit 226M as intensity detecting device.

The I-phase receiving signal multiplying circuit 218M multiplies and demodulates the response wave from the RFID tag circuit part To-M received by the antenna 10M and inputted through the transmit-receive splitter 214M and the generated carrier wave.

The I-phase band-pass filter 219M takes out only a signal in a required band from the output of the I-phase receiving signal multiplying circuit 218M. The I-phase receiving signal amplifier 221M amplifies an output of the I-phase band-pass filter 219M. The I-phase limiter 220M further amplifies the output of the I-phase receiving signal amplifier 221M and converts it to a digital signal.

The phase shifter 227M delays a phase of the carrier wave generated as above by 90°. The Q-phase receiving signal multiplying circuit 222M multiplies the response wave from the RFID tag circuit part To-M received at the antenna 10M and the carrier wave whose phase is delayed by the phase shifter 227M by 90°. The Q-phase band-pass filter 223M takes out only a signal in a required band from the output of the Q-phase receiving signal multiplying circuit 222M. The Q-phase receiving signal amplifier 225M amplifies an output of the Q-phase band-pass filter 223M. The Q-phase limiter 224M further amplifies the output of the Q-phase receiving signal amplifier 225M and converts it to a digital signal.

A signal "RXS-I" outputted from the I-phase limiter 220M and a signal "RXS-Q" outputted from the Q-phase limiter 224M are inputted into the control circuit 202 and processed. The outputs from the I-phase receiving signal amplifier 221M and the Q-phase receiving signal amplifier 225M are also inputted into the RSSI circuit 226M and a signal "RSSI" indicating the intensity of these signals is inputted into the control circuit 202. As above, the reader 200 demodulates the response wave from the RFID tag circuit part To-M by I-Q quadrature demodulation.

The wireless LAN communication part 203 is connected to the control circuit 202 through an input and output interface (not shown).

In the control circuit 202, a communication mode used in the communication with the RFID tag circuit elements To-M and L and the communication mode used in the communication with the antenna 205 of the base station 204 are different from each other. Specific examples of the communication modes different from each other include a protocol and a frequency, for example. As a result, the radio communication by the antennas 10L and 10M with the RFID tag circuit elements To-M and L and the radio communication by the wireless LAN communication part 203 with the base station 204 can be executed exclusively without interference with each other.

If the protocols are different in the two types of radio communication, the control circuit 202 outputs an amplification control signal and a modulation control signal to the radio frequency circuit transmitting portions 212M and 212L corresponding to the protocols. Also, the control circuit 202 executes predetermined calculation processing to process a signal read of the RFID tag circuit elements To-M and To-L on the basis of the protocol after receiving input from the radio frequency circuit receiving portions 213M and 213L.

Also, the control circuit 202 receives input of an operation signal from an operating device such as the operation part 6 and outputs a display control signal to the display part 5 and an alarm signal to the sound alarm device, for example.

The control circuit 202 is a so-called microcomputer. The control circuit 202 has, as shown in FIG. 6, a CPU 202A, which is a central processing unit, a ROM 202B, a RAM 202C, and a circuit control part 202D configured to transmit and receive a signal with respect to the radio frequency circuits 201M and 201L. The control circuit 202 executes signal processing according to a program stored in the ROM 202B in advance using a temporary storage function of the RAM 202C. Also, the control circuit 202 is connected to the communication line 206 (See FIG. 2) through the wireless LAN communication executed between the wireless LAN communication part 203 and the antenna 205 and the base station 204. As a result, the control circuit 202 can take transactions of information with the above-described server 207 connected to the communication line 206 and other terminals, computers, and servers, for example. Also, the control circuit 202 may include the non-volatile memory 202E such as a Flash ROM. The above-described server 207 also includes the CPU, ROM, and RAM, for example, similarly to the control circuit 202.

Characteristics of this embodiment are as follows. That is, as described above, if the operator M wants to make a search of the individual RFID tags Tp1 to 6, Tq1 to 6, and Tr1 to 6, first, the reader 200 makes a search of the corresponding representative RFID tags Ta, Tb, and Tc. If the operator M has gotten close to the representative RFID tags Ta, Tb, and Tc to some degree, a communication mode of the reader 200 is switched. Specifically, a communication frequency used by the reader 200 is switched. After the switching of the communication mode, the reader 200 makes a search of the individual RFID tags Tp1 to 6, Tq1 to 6, and Tr1 to 6. The detailed procedure will be described below in order.

In order to execute the search method as above, the respective tag IDs of the plurality of individual RFID tags and the tag ID of the single corresponding representative RFID tag are registered in correlation and stored and held in advance for each tag group in the database DB. The correlation may be stored in another storage device such as the non-volatile memory 202E. In that case, the reader 200 does not necessarily have to have an access function to the server 207.

The correlation information registered in the database of the server will be described using FIG. 7.

In FIG. 7, the illustrated example shows an example of the tag group G1. As described above using FIG. 1, the tag group G1 includes the six individual RFID tags Tp1, Tp2, Tp3, Tp4, Tp5, Tp6 and the single representative RFID tag Ta. As shown in the figure, in the database DB of the server 207, the tag ID of the RFID tag circuit element To-L of the corresponding representative RFID tag Ta is registered in association with the tag IDs of the respective RFID tag circuit elements To-M of the six individual RFID tags Tp1, Tp2, Tp3, Tp4, Tp5, and Tp6.

The example of the tag group G1 is shown above, but with regard to the tag group G2, too, the tag IDs of the individual RFID tags Tq1, Tq2, Tq3, Tq4, Tq5, Tq6 and the tag ID of the representative RFID tag Tb are similarly stored in correlation (not shown). Also, with regard to the tag group G3, too, the tag IDs of the individual RFID tags Tr1, Tr2, Tr3, Tr4, Tr5, Tr6 and the tag ID of the representative RFID tag Tc are stored in correlation (not shown).

The display part 5 of the reader 200 may display the tabled correlation information by means of an appropriate operation of the operator M.

The control procedure executed by the control circuit of the handheld reader will be described referring to FIGS. 8 to 10. If the reader 200 is powered on, for example, a flow shown in FIG. 8 is started.

First, at Step S10, the control circuit 202 determines if the operator M has operated the operation part 6 and the tag ID of any of the individual RFID tags Tp, Tq, and Tr to be searched has been inputted to the control circuit 202 or not. The operator M directly inputs the tag ID of the targeted individual RFID tag Tp, Tq or Tr in the operation part 6.

Alternatively, the operator M may input an article name, for example, in the operation part 6. In this case, an access is made to the server 207 through the wireless LAN communication part 203 and the base station 204, a search is made in the database DB using the article name, for example, and the tag ID corresponding to the article name, for example, is obtained. If the non-volatile memory 202E performs the equal function instead of the server 207, the tag ID is obtained from the non-volatile memory 202E, for example, by means of input of the article name, for example, in the operation part 6.

At Step S10, if the tag ID of the individual RFID tag Tp, Tq or Tr has been inputted, the determination at Step S10 is satisfied, and the routine goes to Step S20. If the operation has not been made, the determination at Step S10 is not satisfied, and the routine is brought to a standby state till an operation input is made.

At Step S20, the control circuit 202 accesses the database DB of the server 207 through the wireless LAN communication part 203, the base station 204, and the communication line 206. Then, using the tag ID of the individual RFID tag Tp, Tq or Tr obtained at Step S10 and referring to the correlation, whose example is shown in FIG. 7, the tag ID of the corresponding representative RFID tag Ta, Tb or Tc is obtained.

After that, at Step S30, the control circuit 202 determines if the tag ID of the representative RFID tag Ta, Tb or Tc has been obtained or not. Unless the tag ID of the representative RFID tag Ta, Tb or Tc corresponding to the individual RFID tag Tp, Tq or Tr is obtained, the determination is not satisfied. In this case, the routine returns to Step S20 and the similar procedure is repeated. If the tag ID of the representative RFID tag Ta, Tb or Tc is obtained, the determination at Step S30 is satisfied, and the routine goes to Step S100.

At Step S100, the control circuit 202 transmits a control signal to the radio frequency circuit 201L and executes search processing for the representative RFID tag Ta, Tb or Tc specified by the tag ID obtained at Step S30. At this time, if the corresponding representative RFID tag Ta, Tb or Tc is detected, a distance to the detected representative RFID tag Ta, Tb or Tc is also calculated by increasing and decreasing a power from the radio frequency circuit 201L (See FIG. 9, which will be described later). Step S20, Step S30, and Step S100 constitute a first information obtainment portion described in each claim.

After that, at Step S40, the control circuit 202 determines if the distance to the representative RFID tag Ta, Tb or Tc calculated at Step S100 is within a predetermined range or not, that is, if the distance is not more than a predetermined threshold value as a switching condition to switch a frequency. If the distance is out of the predetermined range, that is, larger than the predetermined threshold value, the determination at Step S40 is not satisfied, and the routine returns to Step S100 and repeats the similar procedure. On the other hand, if the distance within the predetermined range, that is, not more than the predetermined threshold value, the determination at Step S40 is satisfied, and the routine goes to Step S50. The procedure at Step S40 constitutes a switching determination portion that determines if the predetermined switching condition is satisfied or not described in each claim.

At Step S50, the control circuit 202 executes frequency switching processing to switch the communication mode. That is, the control circuit 202 switches the frequency as a communication parameter from the UHF band to the HF band. Specifically, a control signal output to the radio frequency circuit 201L corresponding to the UHF band is stopped or a control signal to stop the radio frequency circuit 201L is outputted so as to stop generation of a carrier wave in the UHF band.

This Step S50 functions as a parameter switching portion described in each claim. By means of this procedure, the communication power from the antenna 10L is stopped and the communication power from the antenna 10M is generated at the subsequent Step S200, and thus, this Step S50 also substantially functions as an antenna switching portion.

After that, at Step S200, the control circuit 202 transmits a control signal to the radio frequency circuit 201M instead of the radio frequency circuit 201L and executes search processing for the individual RFID tag Tp, Tq or Tr specified by the tag ID inputted at Step S10 (See FIG. 10, which will be described later). If the search processing for the targeted individual RFID tag Tp, Tq or Tr is finished, this flow is finished. Step S200 constitutes a second information obtainment portion described in each claim.

The detailed procedure of the representative tag search processing at Step S100 will be described referring to FIG. 9.

First, at Step S111, the control circuit 202 initializes a value of the "TX_PWR" signal that determines an amplification rate in the gain control transmission amplifier 217L (See FIG. 5) determining an power value of a transmission signal from the transmitting portion 212L to P1. The value of P1 may be a stored value at the previous control or a predetermined value determined in advance as a roughly suitable value by measurement.

Then, the routine goes to Step S112, and the control circuit 202 transmits a control signal to the transmitting portion 212L of the radio frequency circuit 201L. As a result, a carrier wave at 2.45 GHz, which is the ultra high frequency wave, is generated from the crystal oscillator 230L, the PLL 231L, and the VCO 232L. The generated carrier wave is modulated by the transmission multiplying circuit 216L and further amplified by the gain control transmission amplifier 217L with an amplification rate on the basis of the "TX_PWR" signal, that is, under a condition of "TX_PWR"=P1. Then, a tag-ID reading command signal is transmitted to the IC circuit part 150-L of the RFID tag circuit element To-L disposed in the representative RFID tag Ta, Tb or Tc through the transmit-receive splitter 214L and the antenna 10L. By means of the transmission of this signal, transmission of a response signal is prompted to the RFID tag circuit element To-L disposed in the representative RFID tag Ta, Tb or Tc provided with the corresponding tag ID.

Subsequently, the routine goes to Step S113, and the control circuit 202 receives the response signal corresponding to the tag-ID reading command signal from the RFID tag circuit element To-L through the antenna 10L and takes it in through the receiving portion 213L of the radio frequency circuit 201L. The communication in the UHF band conducted at Step S112 and Step S113 corresponds to the first communication described in each claim. After that, the routine goes to Step S114.

At Step S114, the control circuit 202 determines if the single tag ID specified at Step S112 has been correctly obtained at Step S113 or not using a known Cyclic Redundancy Check (CRC) code, for example.

If the tag ID has been obtained, the determination at Step S114 is satisfied, and the control circuit 202 considers that the targeted representative RFID tag Ta, Tb or Tc has been detected successfully, and the routine goes to Step S115A. At Step S115A, the control circuit 202 determines if the power at obtainment of the tag ID is not more than a predetermined value or not. If the power is not more than the predetermined value, the determination is satisfied, and the control circuit 202 considers that the reader 200 and the representative RFID tag Ta, Tb or Tc have gotten sufficiently close to each other and detection has been achieved, and the routine goes to Step s123.

At Step S123, the control circuit 202 generates a display control signal corresponding to detection success and outputs it to the display part 5 so that the corresponding display is made (not shown).

After that, at Step S120, the control circuit 202 stores the value of the "TX_PWR" signal relating to the required minimum optimal transmission value at that time as P1 to be used at Step S111 next time. Specifically, the control circuit 202 stores the value of P1 in the RAM or the non-volatile memory 202E, for example. The minimum power required for communication with the RFID tag becomes the larger if the distance from the RFID tag gets the longer. Therefore, by calculating the required minimum power as above, the distance to the representative RFID tag Ta, Tb or Tc can be substantially calculated and its position can be detected. Therefore, the procedure at Step S120 constitutes a position detection portion described in each claim. As a result, detection of the representative RFID tag Ta, Tb or Tc to be searched, that is, reading of the tag ID is finished, and this flow is finished.

On the other hand, at Step S115A, if the power is larger than the predetermined value, the determination is not satisfied, and the routine goes to Step S116A. At Step S116A, the control circuit 202 subtracts a predetermined subtraction operator Pstep from the value of the "TX_PWR" signal in order to decrease the power from the transmitting portion 212L in a stepped manner. After that, the routine goes to Step S118.

Also, at Step S114, if the corresponding tag ID has not been correctly obtained, the determination at Step S114 is not satisfied. In this case, the control circuit 202 considers the detection of the targeted representative RFID tag Ta, Tb or Tc as failure, and the routine goes to Step S115B. At Step S115B, the control circuit 202 determines if an elapsed time measured by a timer, for example, since the signal transmission was started at Step S112 has reached a predetermined timeout time. If the time has not reached the timeout time, the determination at Step S115B is not satisfied, and the routine returns to Step S112 and repeats the same procedure. If the time has reached the timeout time, the determination at Step S115B is satisfied, and the routine goes to Step S116B.

At Step S116B, the control circuit 202 adds a predetermined addition operator Pstep' in order to increase the power from the transmitting portion 212L in a stepped manner to the value of the "TX_PWR" signal. After that, the routine goes to step S118.

At Step S118, the control circuit 202 determines if the value of the "TX_PWR" signal is smaller than a predetermined upper limit value determined in advance as an allowable upper limit and larger than 0. As the predetermined upper limit value, a value determined by laws and regulations such as a radio wave law is used. Also, at Step S118, instead of determination on whether or not the value is larger than 0, whether or not the value is larger than a relatively small predetermined value determined in advance may be determined.

If the value of the "TX_PWR" signal becomes larger than the predetermined upper limit value or 0, it means abnormality of the apparatus, the determination at Step S118 is not satisfied, and the routine goes to Step S122. At Step S122, the control circuit 202 outputs an error display signal to the display part 5 or outputs an error sound signal to the sound alarm device 7. As a result, the display part 5 makes error display corresponding to the reading failure or the sound alarm device 7 gives a sound alarm, for example. After that, this flow is finished.

On the other hand, at Step S118, if the "TX_PWR" signal is not 0 but a relatively small value, the determination at Step S118 is satisfied, the routine returns to Step S112, and the same procedure is repeated. That is, after the power is adjusted at Step S116A or Step S116B, the routine returns to Step S112, and transmission is performed. Then, the transmission of the tag-ID reading command signal in order to obtain the tag ID at Step S112 and the power increase and decrease control at Step S116A or Step S116B are performed alternately. Step S116A and Step S116B constitute an power control portion described in each claim.

As described above, obtainment of the tag ID is automatically retried while the communicable range from the reader 200 is increased and decreased, and by repeating this procedure, the reader 200 can narrow down and detect a presence position of the representative RFID tag Ta, Tb or Tc. At this time, how close the distance from the operator to the representative RFID tag Ta, Tb or Tc gets can be also clearly notified to the operator by the automatic power control.

The detailed procedure of the individual tag search processing at Step S200 will be described below referring to FIG. 10.

First, at Step S212 corresponding to Step S112 in FIG. 9, the control circuit 202 transmits a control signal to the transmitting portion 212M of the radio frequency circuit 201M similarly to the above. As a result, the carrier wave at 13.56 MHz, which is a high frequency, is generated from the crystal oscillator 230M, the PLL 231M, and the VCO 232M. This generated carrier wave is modulated by the transmission multiplying circuit 216M and further amplified by the gain control transmission amplifier 217M with an amplification rate on the basis of the "TX_PWR" signal. Then, a tag-ID reading command signal is transmitted to the IC circuit part 150-M of the RFID tag circuit element To-M disposed in the individual RFID tag Tp, Tq or Tr through the transmit-receive splitter 214M and the antenna 10M. As a result, transmission of a response signal is prompted to the RFID tag circuit element To-M disposed in the individual RFID tag Tp, Tq or Tr provided with the corresponding tag ID.

Subsequently, the routine goes to Step S213 corresponding to Step S113, and the control circuit 202 receives the response signal corresponding to the tag-ID reading command signal from the RFID tag circuit element To-M and takes it in through the receiving portion 213M of the radio frequency circuit 201M. The communication in the HF band conducted at Step S212 and Step S213 corresponds to the second communication described in each claim. After that, the routine goes to Step S214.

After that, at Step S214, the control circuit 202 determines if the single tag ID specified at Step S212 has been correctly obtained at Step S213 or not using a CRC code similarly to Step 5114.

If the tag ID has been obtained, the determination at Step S214 is satisfied, and the control circuit 202 considers that the targeted individual RFID tag Tp, Tq or Tr has been detected successfully, and the routine goes to Step S223. At Step S223, the control circuit 202 generates a display control signal and outputs it to the display part 5 similarly to Step S123. As a result, the display part 5 makes display corresponding to successful detection (not shown). As a result, detection of the individual RFID tag Tp, Tq or Tr to be searched, that is, reading of the tag ID is completed, and this flow is finished.

On the other hand, at Step S214, if the corresponding tag ID has not been correctly obtained, the determination at Step S214 is not satisfied. In this case, the control circuit 202 considers the detection of the targeted individual RFID tag Tp, Tq or Tr as failure, and the routine goes to Step S215. At Step S215, the control circuit 202 determines if an elapsed time measured by a timer, for example, since the signal transmission was started at Step S212 has reached a predetermined timeout time similarly to Step S115B. If the time has not reached the timeout time, the determination at Step S215 is not satisfied, and the routine returns to Step S212 and repeats the same procedure. If the time has reached the timeout time, the determination at Step S215 is satisfied, and the routine goes to Step S222.

At Step S222, the control circuit 202 outputs an error display signal to the display part 5 or outputs an error sound signal to the sound alarm device 7. As a result, the display part 5 makes error display corresponding to the reading failure or the sound alarm device 7 gives a sound alarm, for example. After that, this flow is finished.

As described above, in this embodiment, a relatively large number of RFID tags in general, including the three tag groups G1, G2, and G3 including the plurality of RFID tags, are present. In such situation, the operator M makes a search for any of the individual RFID tags Tp1 to 6, Tq1 to 6, and Tr1 to 6 through information reading using the reader 200. First, the reader 200 reads information of the representative RFID tags Ta, Tb, and Tc corresponding to the individual RFID tags Tp1 to 6, Tq1 to 6, and Tr1 to 6. Then, the operator is getting close to the representative RFID tags Ta, Tb, and Tc while the reader 200 is conducting communication for search. If the operator and the representative RFID tags Ta, Tb, and Tc have gotten close to each other to some degree, the reader 200 switches the frequency from the UHF band to the HF band. After this switching, the reader 200 reads information from the individual RFID tags Tp1 to 6, Tq1 to 6, and Tr1 to 6 to be searched in the end. As a result, more efficient and quick search can be made as compared with the search of the individual RFID tags Tp, Tq, and Tr as search targets from the beginning.

Also, particularly in this embodiment, when the information of the individual RFID tags Tp, Tq, and Tr is to be read, communication is conducted using the frequency at 13.56 MHz, which is a high frequency band, while when the information of the representative RFID tags Ta, Tb, and Tc is to be read, the communication is conducted using the frequency of 2.45 GHz, which is an ultra high frequency band.

Here, the radio communication using a high frequency wave in general has a characteristic that a communication distance is short but communication stability is high. On the other hand, the radio communication using an ultra high frequency wave has a characteristic that a communication distance is long but it is likely that information might be read from targets present around the reading target. In this embodiment, by using the high frequency wave and the ultra high frequency wave separately as described above, the following effects can be obtained.

That is, in information reading from the individual RFID tags Tp, Tq, and Tr arranged relatively closely and adjacent with a short distance from each other in each of the tag groups G1, G2, and G3, the reader 200 uses the high frequency wave with a short communication distance. As a result, the reader 200 can reliably conduct communication with each of the individual RFID tags Tp, Tq, and Tr without communication interference. On the other hand, the representative RFID tags Ta, Tb, and Tc, which are present only one in each of the tag groups G1, G2, and G3, are not in a close distance from each other. Therefore, the reader 200 uses an ultra high frequency wave with a relatively long communication distance. As a result, the reader 200 can read information of the representative RFID tags Ta, Tb, and Tc even from a long distance. As described above, in this embodiment, an optimal communication characteristic is obtained by using frequencies separately according to the reading target. As a result, the information can be read reliably and efficiently from the individual RFID tags Tp, Tq, and Tr as final search targets while an influence on communication such as interference in information obtainment is prevented. Also, by using the frequencies different from each other, an effect to reliably prevent radio interference and misreading can be obtained.

The present invention is not limited to the embodiment but is capable of various deformations in a range not departing from its gist and technical scope. The variations will be described below.

(1) If a Distance is Detected by Receiving Signal Intensity:

In the above-described embodiment, the reader 200 changes the power to transmit a tag-ID response reading command signal to the representative RFID tags Ta, Tb, and Tc in a stepped manner (See Step S116A and Step S116B in FIG. 9). Then, the reader 200 determines presence of a response from the representative RFID tags Ta, Tb, and Tc in each stage and calculates a distance to the representative RFID tags Ta, Tb, and Tc so as to detect their positions. However, the present invention is not limited to that. That is, the reader 200 may calculate a distance to the representative RFID tags Ta, Tb, and Tc and detect their positions on the basis of received signal intensity when the reader 200 receives a response signal transmitted from the representative RFID tags Ta, Tb, and Tc, for example.

In this case, the "RSSI" signal inputted from the RSSI circuit 226L in the receiving portion 213L of the radio frequency circuit 201L to the control circuit 202 indicates the received signal intensity. For example, the larger the distance from the reader 200 to the representative RFID tags Ta, Tb, and Tc becomes, the smaller the received signal intensity from the representative RFID tags Ta, Tb, and Tc, that is, the level of the "RSSI" signal becomes. Therefore, on the basis of a detection result of the received signal intensity in communication for position detection by the RSSI circuit 226L, the reader 200 can estimate the distance to the representative RFID tags Ta, Tb, and Tc.

In this case, the reader 200 conducts communication with a predetermined power, which is a fixed value, for example, and received signal intensity usually obtained at a position in a relatively near distance from the reader 200 is set as a threshold value at that time. Then, it is determined if the received signal intensity detected by the RSSI circuit 226L when a search for the representative RFID tags Ta, Tb and Tc is made with the power of the predetermined value is less than the predetermined threshold value or not. If the received signal intensity is smaller than the threshold value, it can be considered that the representative RFID tags Ta, Tb, and Tc are not present in the distance range but are located at relatively far positions.

With this variation, too, the same effect as the above-described embodiment can be obtained.

(2) If Another Communication Parameter is Switched:

In the above-described embodiment, in obtainment of the information from the representative RFID tags Ta, Tb, and Tc, a case in which if the distance from the reader 200 comes within a predetermined range, the communication frequency is switched as a communication parameter was used as an example for description. However, the present invention is not limited to that. That is, instead of the frequency, the communication mode may be made different by switching a communication protocol or by switching a power of a reading signal, for example. In these cases, the representative RFID tags Ta, Tb, and Tc and the individual RFID tags Tp, Tq, and Tr may have a common communication frequency. For example, the both may conduct communication using a radio wave in the HF band or using a radio wave in the UHF band. In this case, the configuration of the radio frequency circuit 201 shown in FIG. 5 can be further simplified. Also, either of the representative RFID tags Ta, Tb, and Tc or the individual RFID tags Tp, Tq, and Tr may be used as a so-called active tag while the other being used as a passive tag as described above. In these cases, too, the same effect as the above-described embodiment can be obtained.

Particularly, if the power is to be switched, the following significance can be provided. That is, in communication with the individual RFID tags Tp, Tq, and Tr, since the search for the representative RFID tags Ta, Tb, and Tc has been finished, it is highly likely that a distance to the individual RFID tags Tp, Tq, and Tr is relatively short. Thus, in the second communication, the power is made smaller than that of the first communication when the representative RFID tags Ta, Tb, and Tc are searched. In this case, an effect that the individual RFID tags Tp, Tq, and Tr can be reliably detected can be obtained while energy loss and wave interference, for example, are prevented. Also, if the communication protocol is to be switched, an effect that wave interference and misreading can be reliably prevented can be obtained.

Other than those described above, methods of the embodiments and each variation may be combined as appropriate for use.

Though not specifically exemplified, the present invention should be put into practice with various changes made in a range not departing from its gist.

What is claimed is:

1. An apparatus for communicating with a radio frequency identification tag comprising:
   a first communication antenna configured to conduct first radio communication with a single representative RFID tag associated so as to represent a plurality of individual RFID tags constituting a single tag group;
   a second communication antenna with characteristics different from said first antenna and configured to conduct second communication with said tag group, the second communication having characteristics different from said first communication;
   storage device configured to store and hold correlation information of said individual RFID tag and said representative RFID tag corresponding the individual RFID tag;
   a first information obtainment portion configured to obtain identification information of said representative RFID tag corresponding to said individual tag to be searched by using said correlation information stored and held in said storage device and to conduct said first communication for search of said representative RFID tag via said first communication antenna by specifying said identification information obtained, and therefore obtain information from said representative RFID tag having the identification information specified;
   a switching determination portion configured to determine if said first communication information obtainment by said first information obtainment portion satisfies a predetermined switching condition based on distance to said representative RFID tag;
   an antenna switching portion configured to switch, as an antenna to be used for communication, said first communication antenna into said second communication antenna if the determination by said switching determination portion is satisfied; and
   a second information obtainment portion configured to specify identification information of said individual RFID tag to be searched and to conduct said second communication for search of said individual RFID tag having said identification information specified via said second communication antenna switched by said antenna switching portion, and therefore to obtain information from said individual RFID tag.

2. The apparatus according to claim 1, further comprising a position detecting portion configured to detect a position of said representative RFID tag corresponding to said individual RFID tag to be searched on the basis of a communication result of said first communication, wherein
   said switching determination portion determines if a detected position by said position detecting portion is within a predetermined distance range or not as said switching condition.

3. The apparatus according to claim 2 further comprising a power control portion configured to control to increase and decrease a power of said first communication antenna when said first communication is conducted, wherein
   said position detecting portion detects the position of said representative RFID tag on the basis of a communication result of said first communication when intensity of said power is increased and decreased by said power control portion.

4. The apparatus according to claim 2 further comprising an intensity detecting device configured to detect received signal intensity from said representative RFID tag; and
   said position detecting portion detects the position of said representative RFID tag on the basis of a detection result of said intensity detecting device when said first communication is conducted.

5. The apparatus according to claim 1, further comprising a parameter switching portion configured to control said first antenna and said second antenna so that a communication parameter is switched which is carried out among said first communication and said second communication.

6. The apparatus according to claim 5, wherein:
   said parameter switching portion sets said communication parameter as a power from said first antenna and said second antenna and switches the power.

7. The apparatus according to claim 5, wherein;
   said parameter switching portion sets said communication parameter as a communication frequency used with said first antenna and said second antenna and switches the communication frequency.

8. The apparatus according to claim 5, wherein:
said parameter switching portion sets said communication parameter as a communication protocol used with said first antenna and said second antenna and switches the communication protocol.

9. A radio communication, system comprising:
a plurality of individual RFID tags constituting a single tag group;
a single representative RFID tag associated so as to represent said plurality of individual RFID tags; and
a radio communication apparatus for selectively executing either a first radio communication with said representative RFID tag or a second communication with said tag group, the second communication having characteristics different from said first communication,
said radio communication comprising:
an identification information obtainment portion configured to obtain identification information of said representative RFID tag corresponding to said individual tag to be searched by using correlation information of said individual RFID tag and said representative RFID tag corresponding to said individual RFID tag;
a first information obtainment portion configured to conduct said first communication for search of said representative RFID tag by means of specifying said identification information obtained by said identification information obtainment portion, and therefore obtain information from said representative RFID tag having the identification information specified;
a switching determination portion configured to determine if said first communication in information obtainment by said first information obtainment portion satisfies a predetermined switching condition based on distance to said representative RFID tag;
a communication switching portion configured to switch, as a communication mode, said first communication into said second communication if the determination by said switching determination portion is satisfied; and
a second information obtainment portion configured to specify identification information of said individual RFID tag to be searched and to conduct said second communication for search of said individual RFID tag having said identification information specified by said second communication switched by said communication switching portion, and therefore obtain information from said individual RFID tag.

* * * * *